US008214113B2

(12) United States Patent
O'Neil et al.

(10) Patent No.: US 8,214,113 B2
(45) Date of Patent: Jul. 3, 2012

(54) RETARDING SYSTEM THAT RETARDS MOTION OF POWER SOURCE

(75) Inventors: Kevin Anthony O'Neil, Raleigh, NC (US); Dennis Alan Barney, Morton, IL (US); Michael David Staub, Metamora, IL (US); Adam Michael Buhs, East Peoria, IL (US); Christopher Kent Hoadley, Kewanee, IL (US)

(73) Assignee: Caterpillar Inc., Peoria, IL (US)

( * ) Notice: Subject to any disclaimer, the term of this patent is extended or adjusted under 35 U.S.C. 154(b) by 1030 days.

(21) Appl. No.: 12/216,125

(22) Filed: Jun. 30, 2008

(65) Prior Publication Data
US 2009/0326770 A1    Dec. 31, 2009

(51) Int. Cl.
*G01C 21/36* (2006.01)

(52) U.S. Cl. ............... 701/54; 477/182; 180/282

(58) Field of Classification Search ............... 701/54, 701/82, 53, 84; 477/97, 118, 182, 186; 188/156; 180/282; G01C 21/36; G06F 19/00
See application file for complete search history.

(56) References Cited

U.S. PATENT DOCUMENTS

| | | |
|---|---|---|
| 5,595,158 A | 1/1997 | Faletti et al. |
| 5,615,653 A | 4/1997 | Faletti et al. |
| 5,647,318 A | 7/1997 | Feucht et al. |
| 6,192,857 B1 | 2/2001 | Shimada |
| 6,240,356 B1 | 5/2001 | Lapke |
| 6,330,873 B1 | 12/2001 | Letang et al. |
| 6,335,577 B1 * | 1/2002 | Baba .............................. 307/28 |
| 6,349,253 B1 | 2/2002 | Bellinger |
| 6,371,065 B1 | 4/2002 | Shiraishi et al. |
| 6,530,862 B2 | 3/2003 | Kolmanovsky |
| 6,609,495 B1 | 8/2003 | Cornell et al. |
| 6,883,318 B2 | 4/2005 | Warner et al. |
| 6,951,198 B1 | 10/2005 | Megli et al. |
| 6,973,787 B2 * | 12/2005 | Klingel ............................ 60/612 |
| 7,001,306 B2 * | 2/2006 | Suzuki ............................ 477/4 |
| 7,010,918 B2 * | 3/2006 | Ruess ............................ 60/624 |
| 7,013,867 B2 | 3/2006 | Rammer et al. |
| 7,162,996 B2 | 1/2007 | Yang |
| 7,235,034 B2 | 6/2007 | Berglund et al. |
| 7,426,975 B2 * | 9/2008 | Toyota et al. ............... 180/165 |
| 7,890,237 B2 * | 2/2011 | Kuwahara et al. ............ 701/51 |
| 7,895,827 B2 * | 3/2011 | Wang et al. ................... 60/286 |
| 7,967,725 B2 * | 6/2011 | Amisano et al. ............ 477/107 |
| 7,971,666 B2 * | 7/2011 | Yamazaki et al. ....... 180/65.265 |
| 8,050,831 B2 * | 11/2011 | Martin et al. ................. 701/54 |
| 8,052,562 B2 * | 11/2011 | Greb et al. ..................... 475/5 |
| 8,088,040 B2 * | 1/2012 | Schiele et al. .............. 477/156 |
| 2001/0016795 A1 * | 8/2001 | Bellinger ....................... 701/53 |
| 2004/0025835 A1 | 2/2004 | Sieber et al. |

(Continued)

*Primary Examiner* — Tuan C. To
(74) *Attorney, Agent, or Firm* — Finnegan, Henderson, Farabow, Garrett & Dunner LLP

(57) ABSTRACT

A retarding system for a mobile machine is disclosed. The machine may have a power source and a traction device driven by the power source. The retarding system may have a speed sensor configured to generate a speed signal indicative of a speed of the machine. Additionally, the retarding system may have a service brake configured to retard motion of the traction device. The retarding system may also have an engine brake configured to retard motion of the power source. In addition, the retarding system may have a controller in communication with the speed sensor, the service brake, and the engine brake. The controller may be configured to substantially concurrently retard motion of the traction device based on the speed signal and retard motion of the power source based on the speed signal.

20 Claims, 5 Drawing Sheets

U.S. PATENT DOCUMENTS

| | | |
|---|---|---|
| 2005/0159271 A1* | 7/2005 | Banta et al. .................. 477/107 |
| 2006/0036361 A1* | 2/2006 | Romer et al. .................. 701/84 |
| 2006/0173599 A1 | 8/2006 | Landes et al. |
| 2007/0062487 A1 | 3/2007 | Balles et al. |
| 2007/0137615 A1 | 6/2007 | Benz et al. |
| 2010/0087973 A1* | 4/2010 | Kaita et al. ..................... 701/22 |

* cited by examiner

RETARDING SYSTEM THAT RETARDS MOTION OF POWER SOURCE

TECHNICAL FIELD

The present disclosure relates generally to a retarding system and, more particularly, to a retarding system that retards motion of a power source.

BACKGROUND

Machines such as, for example, on and off-highway haul trucks, wheel loaders, and other types of mobile machines are used to perform a variety of tasks. Some of these tasks involve traveling downhill along steeply graded surfaces. This downhill travel may accelerate movement of the machines. This acceleration may be substantial and may cause damage to the machines. The damage may be avoided by appropriately retarding movement of the machines. Unfortunately, it may be possible to over-retard movement of the machines, causing the machines to move slower than necessary, thereby reducing efficiencies of the machines, or to under-retard movement of the machines, allowing the machines to move too quickly, thereby over-speeding and damaging drivetrains of the machines.

One way to avoid the over-retarding and/or under-retarding of the movement of machines may be to automate the retarding of the movement of the machines. An example of this strategy is described in U.S. Pat. No. 6,349,253 (the '253 patent) issued to Bellinger on Feb. 19, 2002. The '253 patent describes a system for controlling downhill operation of a vehicle. The system includes a controller operable to control an engine compression brake of the system, a wastegate of a turbocharger of the system, a service brake of the system, and/or a transmission of the system. In particular, the controller regulates the engine compression brake directly to provide a discrete amount of engine retarding torque; the wastegate to modify this amount of engine retarding torque; the transmission to select a gear ratio, which further modifies the amount of engine retarding torque; and/or the service brake to retard wheel motion.

When a speed of the vehicle of the '253 patent is decreasing and below a target speed (i.e., the vehicle is over-retarded) or increasing and above the target speed (i.e., the vehicle is under-retarded), the controller adjusts the amount of engine retarding torque. The controller downwardly adjusts the amount of engine retarding torque by directly controlling the engine compression brake, and then by adjusting the wastegate. Once the controller minimizes the amount of engine retarding torque (by controlling the engine compression brake directly and/or by adjusting the wastegate), the controller deactivates the engine compression brake and ceases controlling the wastegate if the vehicle is still over-retarded. The controller upwardly adjusts the amount of engine retarding torque by adjusting the wastegate, and then by directly controlling the engine compression brake. Once the controller maximizes the amount of engine retarding torque (by adjusting the wastegate and/or by controlling the engine compression brake directly), the controller downshifts the transmission to further increase the engine retarding torque if the vehicle is still under-retarded. Specifically, the controller activates the service brakes, downshifts the transmission, deactivates the service brakes, deactivates the engine compression brake, and adjusts the wastegate to a default setting. The adjusting of the wastegate, direct controlling of the engine compression brake, and downshifting of the transmission are then repeated until the vehicle is no longer under-retarded.

Although the system of the '253 patent may help reduce the under-retarding and/or over-retarding of the vehicle of the '253 patent, the system may do little to maximize continuity of the amount of retarding of the vehicle of the '253 patent. Specifically, the controller of the '253 patent may do little to smooth the decreases and/or increases in retarding torque provided by the engine compression brake as the controller directly controls the engine compression brake to provide discrete amounts of engine retarding torque. Thus, the vehicle of the '253 patent may experience rough accelerations and/or decelerations as the engine retarding torque abruptly increases and/or decreases.

The disclosed method and system are directed to overcoming one or more of the problems set forth above and/or other problems in the art.

SUMMARY

In one aspect, the present disclosure may be directed to a retarding system for a mobile machine. The machine may include a power source and a traction device driven by the power source. The retarding system may include a speed sensor configured to generate a speed signal indicative of a speed of the machine. Additionally, the retarding system may include a service brake configured to retard motion of the traction device. The retarding system may also include an engine brake configured to retard motion of the power source. In addition, the retarding system may include a controller in communication with the speed sensor, the service brake, and the engine brake. The controller may be configured to substantially concurrently retard motion of the traction device and retard motion of the power source. The retarding of motion of the traction device may be based on the speed signal. The retarding of motion of the power source also may be based on the speed signal.

In another aspect, the present disclosure may be directed to a method of retarding movement of a mobile machine. The machine may include a power source and a traction device driven by the power source. The method may include monitoring a first parameter indicative of a speed of the machine. Additionally, the method may include retarding motion of the traction device based on the monitored first parameter. The method may also include, substantially concurrently with the retarding of motion of the traction device, retarding motion of the power source based on the monitored first parameter.

DETAILED DESCRIPTION

Figure 1:
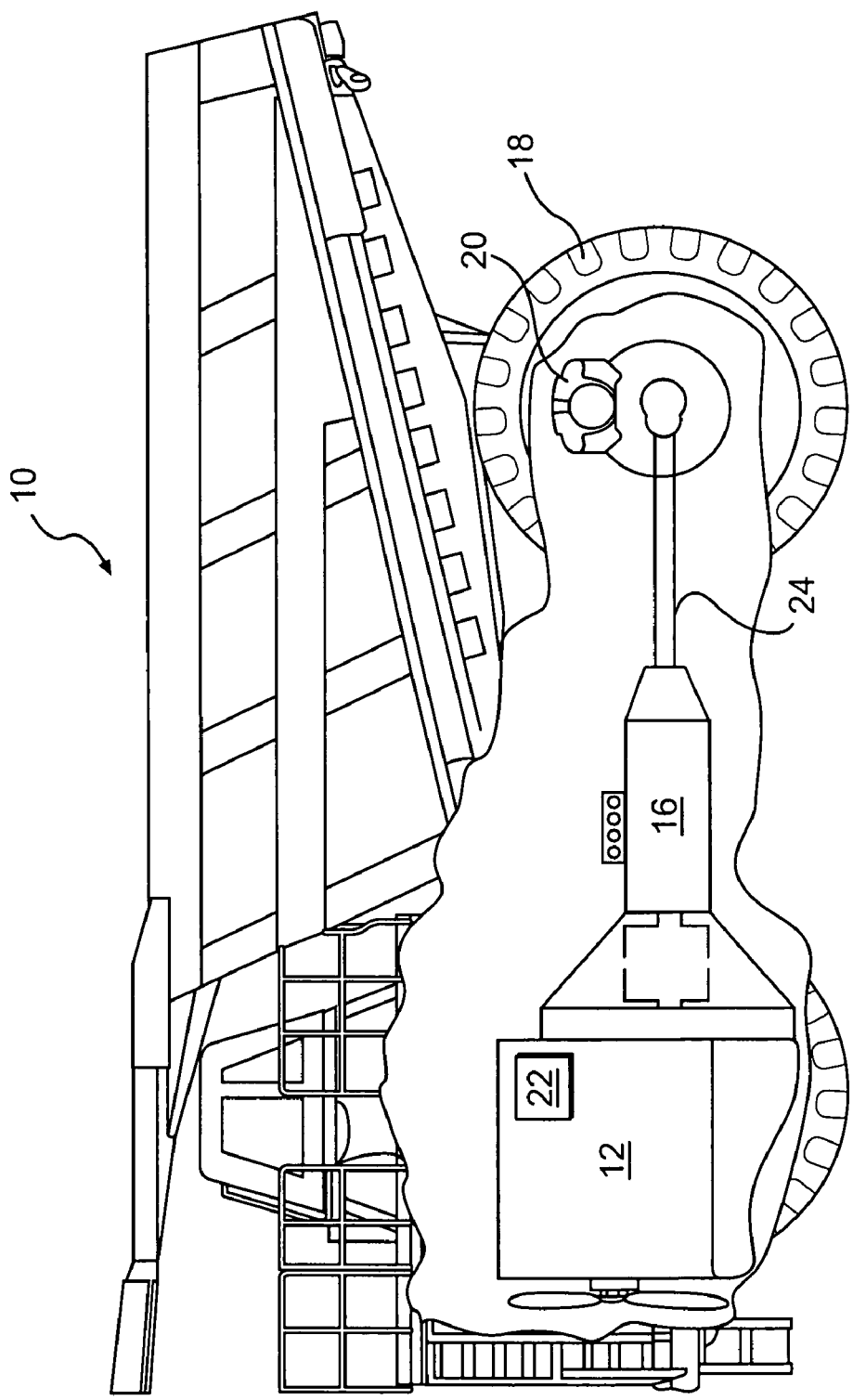
FIG. 1 is a side-view illustration of an exemplary disclosed machine.

FIG. 1 illustrates an exemplary machine 10, which may travel downhill along steeply graded surfaces. Machine 10 may be a mobile machine that performs some type of operation associated with an industry such as mining, construction, farming, transportation, or another industry known in the art. For example, machine 10 may be an earth moving machine such as an off-highway haul truck. Alternatively, machine 10 may be an on-highway haul truck, a passenger vehicle, or another mobile machine that may travel downhill along steeply graded surfaces. Machine 10 may include a power source 12 to propel movement of machine 10. Power source 12 may be operatively connected via a transmission 16 to a traction device 18. Machine 10 also may include a service brake 20 and/or an engine brake 22 to retard motion of machine 10. Service brake 20 may retard motion of traction device 18, while engine brake 22 may retard motion of power source 12.

Power source 12 may be configured to produce a power output and may include an internal combustion engine. For example, power source 12 may include a diesel engine, a gasoline engine, a gaseous fuel-powered engine, or another engine known in the art.

Traction device 18 may include wheels located on each side of machine 10 (only one side shown). Alternatively, traction device 18 may include tracks, belts, or other traction devices.

Transmission 16 may include numerous components that interact to transmit power from power source 12 to traction device 18. In particular, transmission 16 may be a multi-speed bi-directional mechanical transmission having a neutral gear ratio, a plurality of forward gear ratios, and one or more reverse gear ratios. It is contemplated that transmission 16 may be an automatic-type transmission, with gear ratio (hereafter alternatively referred to as "gear") selection based on a power source speed, a maximum selected gear, and a shift map. Alternatively, transmission 16 may be a continuously variable bi-directional mechanical or electrical transmission having a neutral gear, a plurality of designated forward gears, and one or more designated reverse gears. Each of the designated gears may include a predetermined continuous range of gears producible by transmission 16. In yet another alternative, transmission 16 may be a manual-type transmission, with shifting being controlled by an operator of machine 10 (hereafter "the operator"). The output of transmission 16 may be connected to and configured to rotatably drive traction device 18 via a shaft 24, thereby propelling movement of machine 10.

Service brake 20 may be configured to retard motion of machine 10 by retarding motion of traction device 18. Service brake 20 may be a hydraulic pressure-actuated wheel brake such as, for example, a disk brake or a drum brake disposed between traction device 18 and shaft 24. In some embodiments, service brake 20 may be a wear part. In other words, service brake 20 may wear as it retards motion of traction device 18. Sufficient wear may necessitate replacement or refurbishment of at least a portion of service brake 20. Service brake 20 may be pneumatically actuated, mechanically actuated, or actuated by another means known in the art. Service brake 20 may be manually actuated by the operator. Alternatively, service brake 20 may be automatically actuated by a controller of machine 10. In any case, the actuation of service brake 20 may be by way of a service brake signal communicated to service brake 20 and indicative of a service brake retarding level. This service brake retarding level may correspond to a retarding torque of service brake 20. The service brake retarding level may be non-discreet. In other words, the service brake retarding level and the retarding torque of service brake 20 may be continuously variable.

Engine brake 22 may be configured to retard motion of machine 10 by retarding motion of power source 12. Engine brake 22 may include an engine compression brake, an exhaust brake, or another device that selectively retards motion of power source 12 by opening and/or closing valves (not shown) of power source 12, thereby altering fluid flows to and/or from a plurality of cylinders (not shown) of power source 12. Engine brake 22 may be manually actuated by the operator. Alternatively, engine brake 22 may be automatically actuated by a controller of machine 10. In any case, the actuation of engine brake 22 may be by way of an engine brake signal communicated to engine brake 22 and indicative of an engine brake retarding level. This engine brake retarding level may correspond to a variable number of the cylinders experiencing the altered fluid flows. For example, an engine brake retarding level of 1 may correspond to ⅓ of the cylinders of power source 12 experiencing the altered fluid flows. As another example, an engine brake retarding level of 2 may correspond to ⅔ of the cylinders of power source 12 experiencing the altered fluid flows. As yet another example, an engine brake retarding level of 0.75 may correspond to ¾ of the cylinders of power source 12 experiencing the altered fluid flows. The engine brake retarding level may be discreet. In other words, the engine brake retarding level and the number of cylinders experiencing the altered fluid flows may not be continuously variable.

Figure 2:
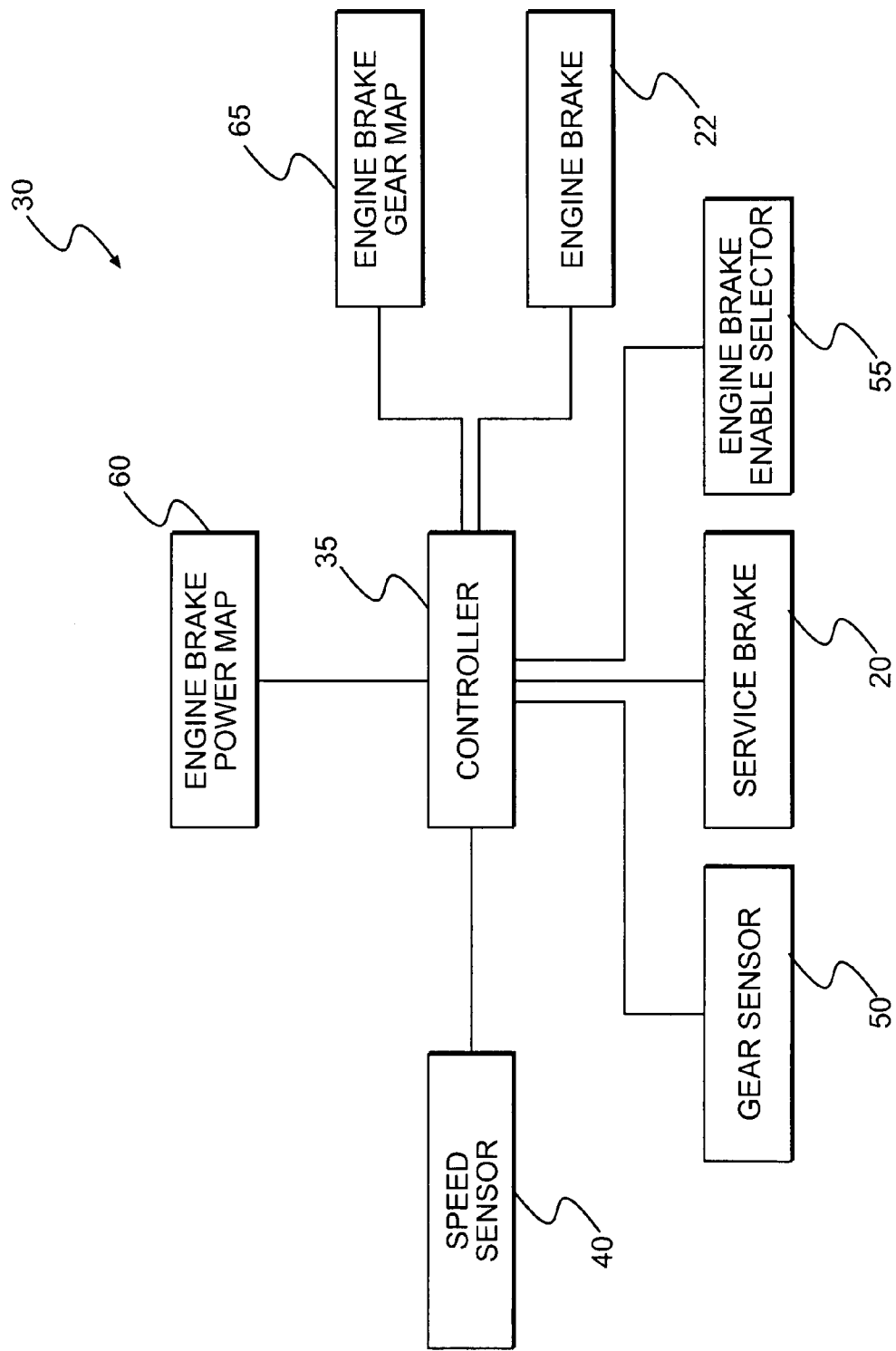
FIG. 2 is a diagrammatic illustration of an exemplary disclosed retarding system for the machine of FIG. 1.

Although, as previously discussed, the operator may manually actuate service brake 20 and engine brake 22, it is contemplated that machine 10 may include a retarding system 30 (referring to FIG. 2) that automatically and appropriately actuates service brake 20 and engine brake 22 to retard movement of machine 10. As illustrated in FIG. 2, retarding system 30 may include a controller 35, which may include one or more processors (not shown) and one or more memory devices (not shown). Controller 35 may communicate with various sensors and/or maps to obtain and/or determine information regarding operation of machine 10. In particular, controller 35 may communicate with a speed sensor 40 to monitor a parameter indicative of a speed of machine 10. Controller 35 may also communicate with a gear sensor 50 to monitor a parameter indicative of a selected gear of transmission 16. Additionally, controller 35 may communicate with an engine brake enable selector 55 to monitor a desired enablement status of engine brake 22. Controller 35 may also communicate with an engine brake power map 60 to determine engine brake 22 power consumptions associated with the maximum engine brake retarding level and various speeds of power source 12. In addition, controller 35 may communicate with an engine brake gear map 65 to determine allowable engine brake retarding levels associated with the selected gear of transmission 16. Based on the obtained and/or determined information, controller 35 may actuate service brake 20 and/or engine brake 22 to retard motion of machine 10.

Speed sensor 40 may include a sensor configured to sense a speed of machine 10. For example, this sensed speed may be a speed of power source 12. Alternatively, the sensed speed may be a ground speed of machine 10. In yet another alternative, the sensed speed may be a rotational speed of shaft 24 or another component rotatably connecting power source 12 to traction device 18. Speed sensor 40 may generate and communicate to controller 35 a speed signal indicative of the sensed speed. It should be understood that controller 35 may, based on the speed signal, determine the sensed speed. Additionally, controller 35 may convert the sensed speed to other speeds of machine 10 using methods known in the art. For example, controller 35 may convert sensed speeds indicative of speeds of power source 12 into ground speeds of machine 10.

Gear sensor 50 may include a sensor configured to sense the selected gear of transmission 16. Gear sensor 50 may generate and communicate to controller 35 a signal indicative of this selected gear.

Engine brake enable selector 55 may provide the operator a means of interfacing with retarding system 30. In particular, engine brake enable selector 55 may allow the operator to communicate a desired enablement status of engine brake 22 to controller 35. Engine brake enable selector 55 may include, for example, a user interface device such as a foot pedal, a joystick controller, a lever, a switch, a button, a wheel, or another user interface device known in the art. Engine brake enable selector 55 may generate and communicate to controller 35 an ON/OFF signal indicative of the desired enablement status of engine brake 22.

Figure 3:
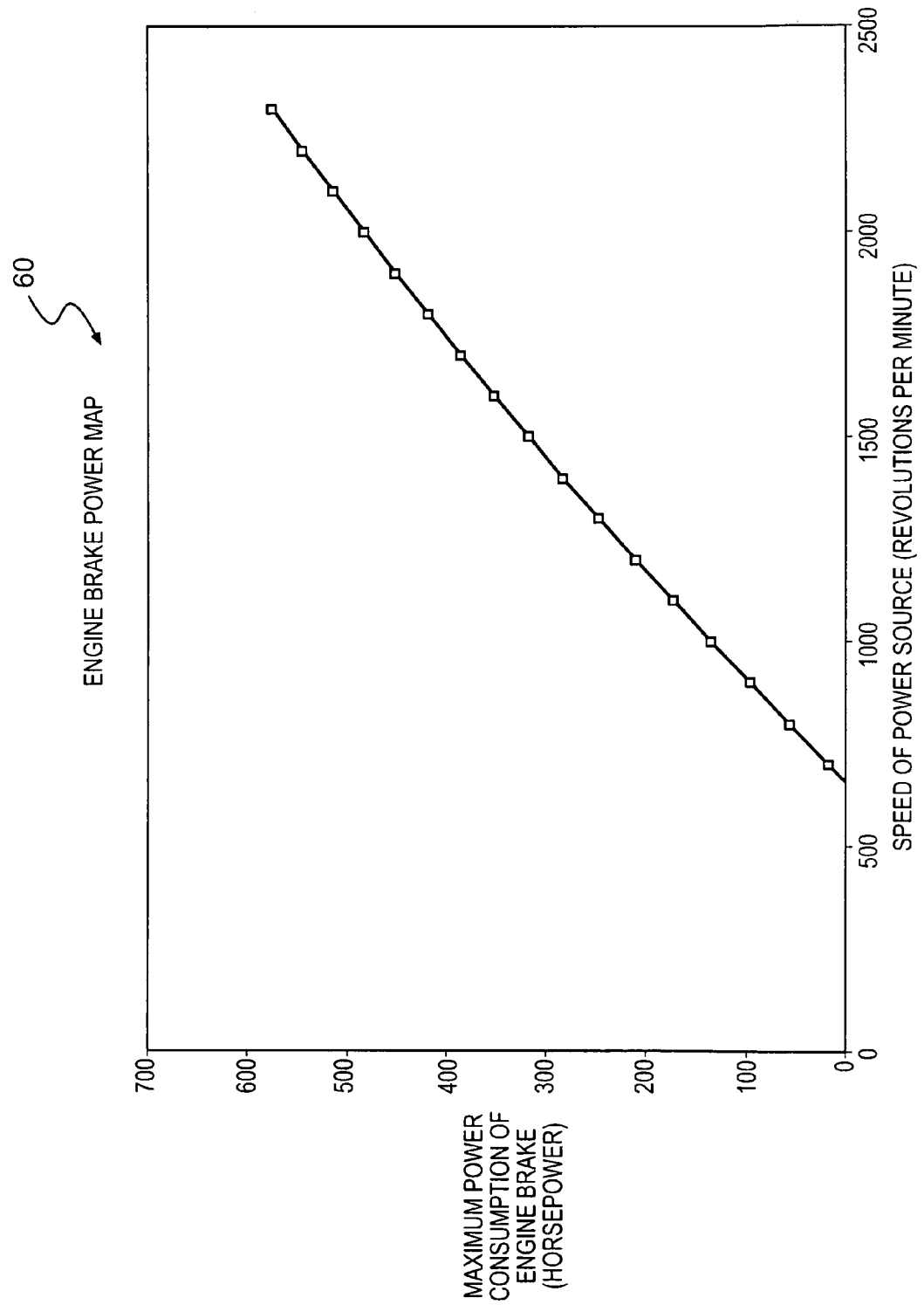
FIG. 3 is a graphical illustration of an exemplary disclosed engine brake power map for use with the retarding system of FIG. 2.

Engine brake power map 60 may include a data structure accessible by controller 35. As illustrated in FIG. 3, engine brake power map 60 may relate the speed of power source 12 to the maximum power consumption of engine brake 22 (the power consumption of engine brake 22 when operated at the maximum engine brake retarding level). It should be understood that the relation and values illustrated in FIG. 3 are exemplary only. In some embodiments, the relation may be linear, while in other embodiments the relation may be non-linear. Moreover, in some embodiments engine brake 22 may operate at lower and/or higher power source 12 speeds than those illustrated in FIG. 3. It should be noted that the speed of power source 12 may vary with respect to a rotational speed of traction device 18 based on the selected gear of transmission 16. For example, the selected gear may cause the speed of power source 12 to be higher than the speed of traction device 18, lower than the speed of traction device 18, or equal to the speed of traction device 18. As torque is directly related to power and inversely related to speed, the selected gear may also cause a torque absorbed by engine brake 22 to be higher than a torque provided by traction device 18, lower than the torque provided by traction device 18, or equal to the torque provided by traction device 18. It is contemplated that sufficiently high torques may damage machine 10. Therefore, some power consumptions (and engine brake retarding levels) of engine brake 22 may be disallowed when certain gears are selected.

Engine brake gear map 65 may include another data structure accessible by controller 35. As shown in Table 1, engine brake gear map 65 may relate engine brake retarding levels, selected gears of transmission 16, and allowability states. For example, operating engine brake 22 at engine brake retarding level 2 while gear 6F is selected may be allowable. But, operating engine brake 22 at engine brake retarding level 2 while gear 2F is selected may be unallowable. It should be understood that the relations shown in Table 1 are exemplary only. In some embodiments, there may be fewer engine brake retarding levels and/or gears, while in other embodiments there may be more engine brake retarding levels and/or gears. Also, in some embodiments, there may be a direct relation between the engine brake retarding level and the number of cylinders experiencing altered fluid flows, while in other embodiments there may be another relation between the engine brake retarding level and the number of cylinders experiencing altered fluid flows. Additionally, in some embodiments, engine brake gear map 65 may be static (unalterable by the operator), while in other embodiments engine brake gear map 65 may be alterable by the operator. For example, the operator may alter engine brake gear map 65 such that operating engine brake 22 at engine brake retarding level 3 is unallowable regardless of which gear is selected. In so doing, the operator may prevent operation of engine brake 22 at engine brake retarding level 3.

TABLE 1

| | | Engine Brake Retarding Level (# of Cylinders Experiencing Altered Fluid Flows) | | | |
| --- | --- | --- | --- | --- | --- |
| | | 0 (0) | 1 (1/3) | 2 (2/3) | 3 (all) |
| Gear Selected | 1F | Allowable | Unallowable | Unallowable | Unallowable |
| | 2F | Allowable | Unallowable | Unallowable | Unallowable |
| | 3F | Allowable | Allowable | Unallowable | Unallowable |
| | 4F | Allowable | Allowable | Allowable | Unallowable |
| | 5F | Allowable | Allowable | Allowable | Unallowable |
| | 6F | Allowable | Allowable | Allowable | Allowable |
| | 7F | Allowable | Allowable | Allowable | Allowable |

Figure 4:
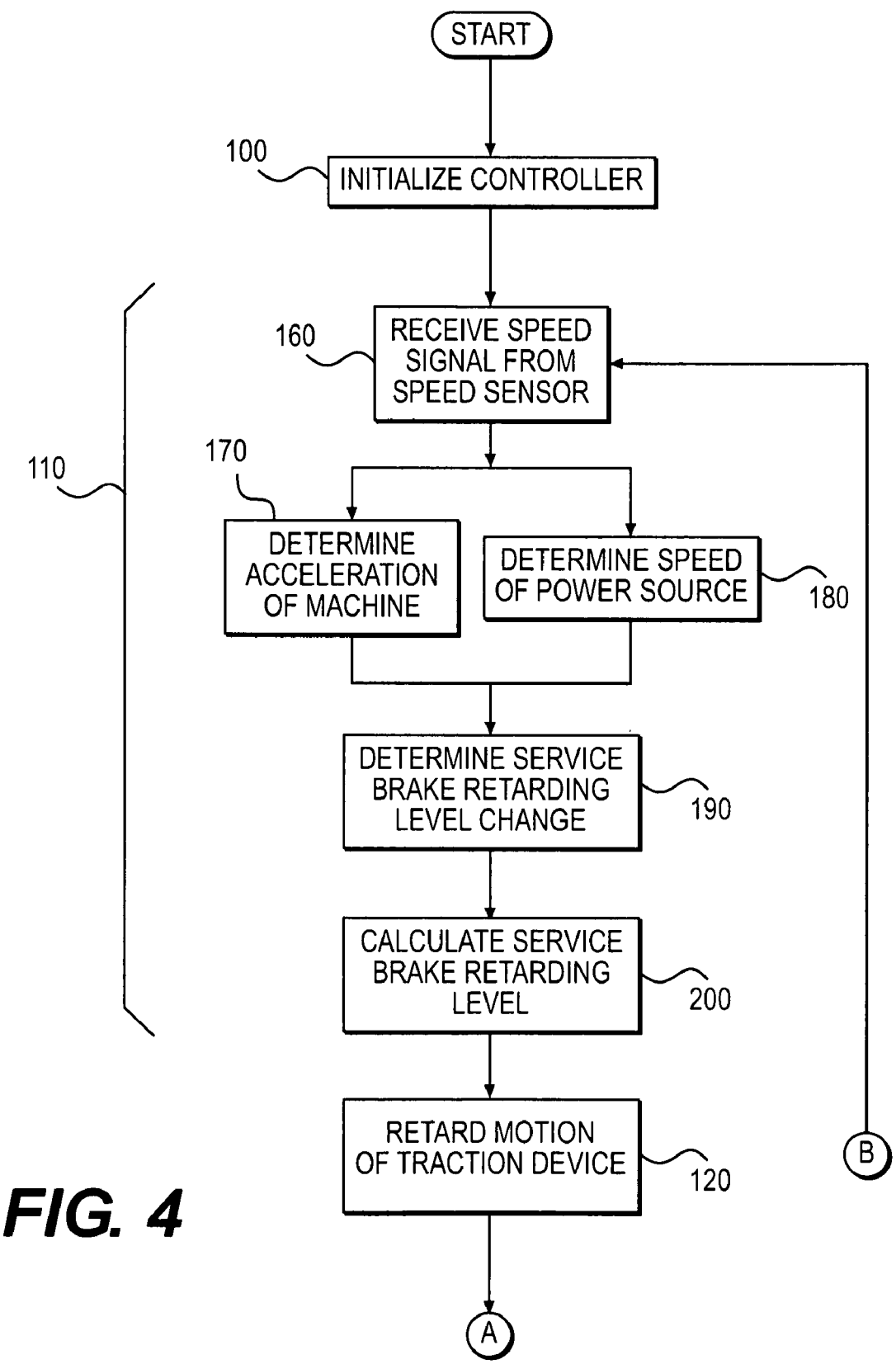
FIGS. 4 and 5 are together a flow chart describing an exemplary method of operating the retarding system of FIG. 2.
Figure 5:
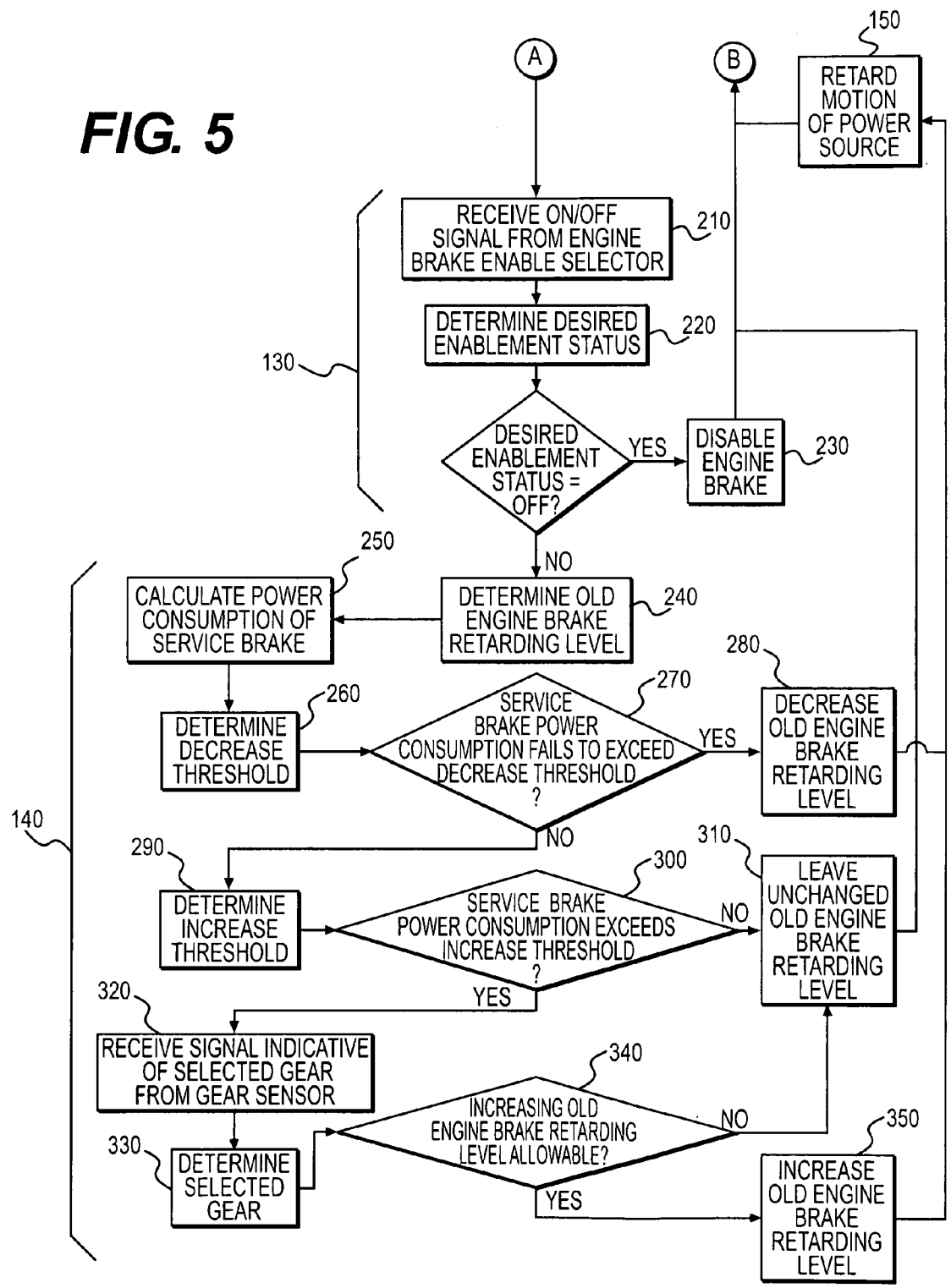

FIGS. 4 and 5 together illustrate an exemplary method of operating retarding system 30 to appropriately retard motion of machine 10 as machine 10 travels. FIGS. 4 and 5 will be discussed in the following section to further illustrate retarding system 30 and its operation.

INDUSTRIAL APPLICABILITY

The disclosed system may be applicable to mobile machines. The system may appropriately retard motion of the machines as the machines travel. In particular, the system may retard motion of the machines by retarding motion of traction devices and/or power sources of the machines based on speeds of the machines. Operation of the system will now be described.

As illustrated in FIG. 4, operation of retarding system 30 may commence at a step 100, which may include initialization of controller 35. Based on this initialization and the speed signal generated by speed sensor 40, controller 35 may, at a step 110, determine the service brake retarding level. Controller 35 may then, at a step 120, retard motion of traction device 18 by actuating service brake 20 based on the service brake retarding level. As illustrated in FIG. 5, controller 35 may also, at a step 130, disable engine brake 22 based on the ON/OFF signal generated by engine brake enable selector 55 or the service brake retarding level. If controller 35 disables engine brake 22, controller 35 may proceed back to step 110 (referring to FIG. 4). Otherwise, controller 35 may, at a step 140, determine the engine brake retarding level based on the initialization, the speed signal, and the service brake retarding level. If the engine brake retarding level is left unchanged, controller 35 may proceed back to step 110. Otherwise, controller 35 may, at a step 150, substantially concurrent with step 120, retard motion of power source 12 by actuating engine brake 22 based on the engine brake retarding level. Controller 35 may then proceed back to step 110.

The initialization of step 100, illustrated in FIG. 4, may include initializing scale factors used by controller 35 during step 140 (referring to FIG. 5). For example, these scale factors may include an offset scale factor and engine brake retarding level scale factors. Controller 35 may multiply the offset scale factor by maximum power consumptions of engine brake 22 to determine offset thresholds, which may be used by controller 35 during step 140 to determine whether to increase and/or decrease the engine brake retarding level. Controller 35 may also multiply the engine brake retarding level scale factors by maximum power consumptions of engine brake 22 to determine engine brake 22 power consumptions associated with engine brake retarding levels. These engine brake 22 power consumptions may be used by controller 35 during step 140 to determine whether to increase the engine brake retarding level.

The determining of the service brake retarding level (step 110) may include sub-steps. In particular, controller 35 may receive from speed sensor 40 the speed signal (sub-step 160). Controller 35 may then determine an acceleration of machine 10 based on the speed signal (sub-step 170). This acceleration may include a magnitude and/or a direction. The magnitude of the acceleration may be related to a change in the ground speed of machine 10, the speed of power source 12, the speed of traction device 18, the speed of shaft 24, or the speed of another component rotatably connecting power source 12 to traction device 18. As previously discussed, controller 35 may determine these speeds based on the speed signal using methods known in the art. The direction of the acceleration may be positive when the speed(s) are increasing, while the direction of the acceleration may be negative when the speed(s) are decreasing.

Before, after, or concurrently with sub-step 170, controller 35 may also determine the speed of power source 12 based on the speed signal (sub-step 180). Specifically, controller 35 may determine the sensed speed based on the speed signal. Controller 35 may then convert the sensed speed into the speed of power source 12 using methods known in the art.

Controller 35 may then determine a service brake retarding level change based on the speed of power source 12 and the acceleration of machine 10 (sub-step 190). For example, controller 35 may compare the speed of power source 12 to a predetermined acceptable speed of power source 12. This predetermined acceptable speed of power source 12 may be, for example, a speed above which power source 12 and/or other components of machine 10 may be damaged. If the speed of power source 12 is above the predetermined acceptable speed of power source 12, controller 35 may determine that a desired direction of acceleration of machine 10 is negative. But, if the speed of power source 12 is below the predetermined acceptable speed of power source 12, controller 35 may determine that the desired direction of acceleration of machine 10 is positive. It is contemplated that controller 35 may also determine a desired magnitude of acceleration of machine 10. For example, this desired magnitude may be related to a magnitude of the difference between the speed of power source 12 and the predetermined acceptable speed of power source 12. Controller 35 may then determine an acceleration change sufficient to convert the magnitude and direction of acceleration determined during sub-step 170 into the desired magnitude and direction of acceleration. Next, controller 35 may calculate the service brake retarding level change based on this acceleration change. Specifically, controller 35 may use methods known in the art to relate the acceleration change to a retarding torque change. This retarding torque change may correspond to the service brake retarding level change.

Next, controller 35 may calculate the service brake retarding level (sub-step 200) by summing an old service brake retarding level (the service brake retarding level of service brake 20 during step 110) and the service brake retarding level change (determined during sub-step 190). Controller 35 may then proceed to step 120 and retard motion of traction device 18.

The retarding of motion of traction device 18 (step 120) may be by way of the service brake signal. Specifically, controller 35 may generate and communicate to service brake 20 the service brake signal, which may be indicative of the service brake retarding level. The service brake signal may actuate service brake 20 such that the retarding torque provided by service brake 20 accords with the service brake retarding level determined during step 110.

As illustrated in FIG. 5, the disabling of engine brake 22 (step 130) may include sub-steps. In particular, controller 35 may receive from engine brake enable selector 55 the ON/OFF signal (sub-step 210). Controller 35 may then determine the desired enablement status of engine brake 22 based on the ON/OFF signal (sub-step 220). Alternatively, controller 35 may determine the desired enablement status of engine brake 22 based on the service brake retarding level. For example, the desired enablement status may be "OFF" unless the service brake retarding level exceeds a predetermined threshold. If the desired enablement status is "OFF," controller 35 may proceed to a sub-step 230 and disable engine brake 22. Controller 35 may then inhibit the retarding of motion of power source 12 by proceeding directly from step 130 to step 110, avoiding steps 140-150. If the desired enablement status is "ON," controller 35 may proceed to step 140 and determine the engine brake retarding level.

The determining of the engine brake retarding level (step 140) may include sub-steps. In particular, controller 35 may determine, at a sub-step 240, an old engine brake retarding level (i.e., the engine brake retarding level from a previous iteration of steps 110-150).

Before, after, or concurrently with sub-step 240, controller 35 may also calculate the power consumption of service brake 20 (sub-step 250). Specifically, controller 35 may multiply the speed of machine 10 by the retarding torque of service brake 20 and a constant. As previously discussed, the retarding torque of service brake 20 may correspond to the service brake retarding level (calculated during sub-step 200). The constant may be determined using methods known in the art. The constant may vary based on which speed of machine 10 is included in the calculation of sub-step 250. For example, if the retarding torque of service brake 20 is measured in foot pounds, the speed of machine 10 is measured in revolutions per minute, and the constant is $\frac{1}{5252}$, the power consumption of service brake 20 may be measured in horsepower.

Additionally, and before, after, or concurrently with sub-step 250, controller 35 may determine a decrease threshold for use in determining whether to decrease the old engine brake retarding level (sub-step 260). The determining of the decrease threshold may include accessing engine brake power map 60. In particular, controller 35 may access engine brake power map 60 to determine the maximum power consumption of engine brake 22 at the speed of power source 12 (determined during sub-step 180). Controller 35 may then multiply this maximum power consumption by the offset scale factor (initialized during step 100) to calculate an offset threshold associated with the speed of power source 12. This offset threshold may be equivalent to the decrease threshold. Alternatively, the determining of the decrease threshold may not include accessing engine brake power map 60. For example, controller 35 may set the decrease threshold to zero when the old engine brake retarding level is zero.

Controller 35 may compare the decrease threshold to the power consumption of service brake 20 (sub-step 270). If the power consumption of service brake 20 fails to exceed the decrease threshold, controller 35 may decrease the old engine brake retarding level to determine the engine brake retarding level (sub-step 280), and then proceed to step 150. Otherwise, controller 35 may determine an increase threshold for use in determining whether to increase the old engine brake retarding level (sub-step 290).

The determining of the increase threshold may include accessing engine brake power map 60. In particular, controller 35 may access engine brake power map 60 to determine the maximum power consumption of engine brake 22 at the speed of power source 12 (determined during sub-step 180). Controller 35 may then multiply this maximum power consumption by the offset scale factor (initialized during step 100) to calculate the offset threshold. Controller 35 may also multiply the maximum power consumption by an engine brake retarding level scale factor associated with the old engine brake retarding level to determine an old power consumption of power source 12. Additionally, controller 35 may multiply the maximum power consumption by an engine brake retarding level scale factor associated with another engine brake retarding level (the engine brake retarding level to which the old engine brake retarding level may be increased during sub-step 350, discussed below) to determine a new power consumption of power source 12. Controller 35 may then determine the increase threshold by adding to the offset threshold a difference between the old power consumption of power source 12 and the new power consumption of power source 12. It should be noted that this addition of the difference between the old and new power consumptions of power source 12 may cause the increase threshold to exceed the decrease threshold. Alternatively, the determining of the increase threshold may not include accessing engine brake power map 60. For example, controller 35 may set the increase threshold to infinity when the old engine brake retarding level is the maximum engine brake retarding level, and then proceed directly to sub-step 310.

Controller 35 may then compare the increase threshold to the power consumption of service brake 20 (sub-step 300). If the power consumption of service brake 20 fails to exceed the increase threshold, controller 35 may leave unchanged the old engine brake retarding level (sub-step 310), and proceed back to step 110. If the power consumption of service brake 20 exceeds the increase threshold, controller 35 may receive from gear sensor 50 the signal indicative of the selected gear (sub-step 320). Controller 35 may then determine the selected gear based on this signal (sub-step 330).

Next, controller 35 may determine whether increasing the old engine brake retarding level is allowable by accessing engine brake gear map 65 (sub-step 340). In particular, controller 35 may access engine brake gear map 65 to determine whether increasing the old engine brake retarding level is allowable based on the selected gear (determined during sub-step 330) and the engine brake retarding level to which the old engine brake retarding level may be increased during sub-step 350. If allowable, controller 35 may increase the old engine brake retarding level to determine the engine brake retarding level (sub-step 350), and then proceed to step 150. Otherwise, controller 35 may leave unchanged the old engine brake retarding level (sub-step 310), and proceed back to step 110.

The retarding of motion of power source 12 (step 150) may be by way of the engine brake signal. Specifically, controller 35 may generate and communicate to engine brake 22 the engine brake signal, which may be indicative of the engine brake retarding level. The engine brake signal may actuate engine brake 22 such that the number of cylinders experiencing the altered fluid flows is adjusted to accord with the engine brake retarding level determined during step 140. Controller 35 may then proceed back to step 110.

It is contemplated that controller 35 may, by repeating steps 110-150, appropriately retard motion of machine 10 as machine 10 travels. Specifically, controller 35 may repeatedly actuate service brake 20 to slow, maintain, or increase the speed of machine 10. Slowing and/or maintaining the speed of machine 10 may help minimize and/or prevent damage to power source 12 and/or other components of machine 10 caused by excessive power source 12 speeds. Increasing the speed of machine 10 may help increase an efficiency of machine 10.

It is further contemplated that the repeated actuation of engine brake 22 may help decrease wear to service brake 20 by reducing the power consumption of service brake 20. In particular, controller 35 may reduce the power consumption of service brake 20 by supplementing the retarding of motion by service brake 20 with retarding of motion by engine brake 22. Specifically, the magnitude of positive acceleration of machine 10 may decrease when the engine brake retarding level is increased. This decreased magnitude may in turn cause a reduction in the service brake retarding level, which may reduce the power consumption of service brake 20.

The reduction in the service brake retarding level may also help maximize continuity in the retarding of machine 10. This is because the reduction in the service brake retarding level may substantially compensate for the increased engine brake retarding level. This compensation may be feasible because the engine brake retarding level may only be increased if the power consumption of service brake 20 exceeds the increase threshold. It is contemplated that the power consumption of service brake 20 may be sufficiently reduced to compensate for the increased engine brake retarding level if the power consumption of service brake 20 exceeds the increase threshold.

Similarly, increases in the service brake retarding level may help maximize continuity in the retarding of machine 10 because they may substantially compensate for decreased engine brake retarding levels. This compensation may be feasible because the service brake retarding level may be increased soon after the power consumption of service brake 20 traverses the decrease threshold. In particular, the engine brake retarding level may be decreased when the power consumption of service brake 20 fails to exceed the decrease threshold. The magnitude of positive acceleration of machine 10 may increase when the engine brake retarding level is decreased. This increased magnitude may in turn cause an increase in the service brake retarding level, which may substantially compensate for the decreased engine brake retarding level caused by the power consumption of service brake 20 traversing the decrease threshold.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A retarding system for a mobile machine having a power source and a traction device driven by the power source, the retarding system comprising:
   a speed sensor configured to generate a speed signal indicative of a speed of the mobile machine;
   a service brake configured to retard motion of the traction device;
   an engine brake configured to retard motion of the power source; and
   a controller in communication with the speed sensor, the service brake, and the engine brake, the controller being configured to substantially concurrently:
   determine a power consumption of the service brake;
   retard motion of the traction device based on the speed signal; and
   retard motion of the power source based on the power consumption of the service brake.

2. The retarding system of claim 1, wherein:
   the controller is further configured to determine a retarding torque of the service brake; and wherein determining the power consumption of the service brake includes multiplying the speed of the mobile machine by the retarding torque of the service brake and a constant.

3. The retarding system of claim 1, wherein:
the controller is further configured to:
determine a service brake retarding level based on the speed signal;
determine an engine brake retarding level based on the service brake retarding level; and
the retarding of motion of the power source is based on the engine brake retarding level.

4. The retarding system of claim 1, wherein the retarding of motion of the power source includes increasing the retarding of motion of the power source when the power consumption of the service brake exceeds a first threshold.

5. The retarding system of claim 4, wherein the retarding of motion of the power source includes decreasing the retarding of motion of the power source when the power consumption of the service brake fails to exceed a second threshold.

6. The retarding system of claim 5, wherein the first threshold exceeds the second threshold.

7. The retarding system of claim 1, wherein:
the power source includes a plurality of cylinders;
the engine brake alters a communication of a fluid to or from at least one of the plurality of cylinders; and
the retarding of motion of the power source includes adjusting a number of the plurality of cylinders for which the communication of the fluid is altered.

8. The retarding system of claim 1, wherein:
the controller is further configured to determine an engine brake retarding level based on the speed signal; and
the retarding of motion of the power source is based on the engine brake retarding level.

9. The retarding system of claim 1, further including a gear sensor configured to generate a signal indicative of a selected gear, wherein the controller is in communication with the gear sensor and the retarding of motion of the power source also is based on the selected gear.

10. The retarding system of claim 1, further including an engine brake enable selector configured to generate a signal indicative of a desired enablement status of the engine brake, wherein the controller is in communication with the engine brake enable selector and is further configured to inhibit the retarding of motion of the power source based on the desired enablement status of the engine brake.

11. A method of retarding movement of a mobile machine having a power source and a traction device driven by the power source, the method comprising:
monitoring a first parameter indicative of a speed of the mobile machine;
determining with a controller a power consumption of a service brake of the mobile machine;
retarding motion of the traction device with the controller based on the monitored first parameter; and
substantially concurrently with the retarding of motion of the traction device, retarding motion of the power source with the controller based on the power consumption of the service brake.

12. The method of claim 11, further including determining a service brake retarding level based on the monitored first parameter, wherein the retarding of motion of the traction device is based on the service brake retarding level.

13. The method of claim 12, further including determining an engine brake retarding level based on the service brake retarding level, wherein the retarding of motion of the power source is based on the engine brake retarding level.

14. The method of claim 11, wherein the retarding of motion of the power source includes increasing the retarding of motion of the power source when the power consumption of the service brake associated with the traction device exceeds a first threshold.

15. The method of claim 14, wherein the retarding of motion of the power source includes decreasing the retarding of motion of the power source when the power consumption of the service brake fails to exceed a second threshold.

16. The method of claim 15, wherein the first threshold exceeds the second threshold.

17. The method of claim 11, further including determining an engine brake retarding level based on the monitored first parameter, wherein the retarding of motion of the power source is based on the engine brake retarding level.

18. The method of claim 11, further including monitoring a second parameter indicative of a selected gear, wherein the retarding of motion of the power source also is based on the monitored second parameter.

19. The method of claim 11, further including:
monitoring a third parameter indicative of a desired enablement status of an engine brake associated with the power source; and
inhibiting the retarding of motion of the power source based on the monitored third parameter.

20. A method of retarding movement of a mobile machine having a power source and a traction device driven by the power source, the method comprising:
monitoring a parameter indicative of a speed of the mobile machine;
determining with a controller a service brake retarding level based on the monitored parameter;
determining with the controller a retarding torque of the service brake;
determining with the controller a power consumption of the service brake based on the retarding torque and the speed of the mobile machine;
retarding motion of the traction device with the controller based on the service brake retarding level; and
retarding motion of the power source with the controller based on the power consumption of the service brake.

* * * * *